UNITED STATES PATENT OFFICE.

LORENZ ACH, OF MANNHEIM, GERMANY, ASSIGNOR TO C. F. BOEHRINGER & SOEHNE, OF MANNHEIM, GERMANY, A FIRM.

PROCESS OF MAKING CAMPHOR.

No. 802,792.

Specification of Letters Patent.

Patented Oct. 2, 1905.

Application filed May 2, 1905. Serial No. 258,552.

*To all whom it may concern:*

Be it known that I, LORENZ ACH, a citizen of the German Empire, residing at Mannheim, Germany, have invented certain new and useful Improvements in Processes of Producing Camphor from Isoborneol; and I do hereby declare the following to be a full, clear, and exact description of the invention, such as will enable others skilled in the art to which it appertains to make and use the same.

This invention relates to a process of producing camphor from isoborneol.

It has been common heretofore to oxidize isoborneol by means of acid solutions to produce camphor. It has also been proposed to oxidize borneol in an alkaline solution—namely, by acting upon it with a weak solution of permanganate in water. These methods, however, do not lead to a ready production of camphor. I have found now that the conversion of isoborneol to camphor can be done very easily and rapidly by the action of chlorin upon the isoborneol. In employing chlorin I may use it either in the gaseous state or in solution—for example, in water, carbontetrachlorid, chloroform. Upon leading chlorin gas over finely-powdered isoborneol a reaction takes place, the mass becoming warmer and hydrochloric acid being evolved. In order to moderate the reaction, the chlorin may be diluted with any suitable indifferent or inert gas—for example, air, carbonic acid—care being taken that the reaction proceeds in a moderate manner by exterior cooling, preferably to a temperature of about 30° centigrade, and by a thorough mixing or stirring of the mass. The isoborneol instead of being used in a pulverized condition may also be employed in solution in any suitable medium—as, for example, benzene or chloroform. When working in aqueous solution, one can employ either the calculated amount of saturated chlorin water or a smaller quantity of water wherein the requisite weight of chlorin gas is gradually passed.

In order to explain my invention in detail, I give hereinbelow three specific examples of processes embodying my invention.

Example I: 15.4 kilograms of isoborneol are dissolved in sixteen kilograms of benzene, and to this is added a solution of 7.1 kilograms of chlorin in nine hundred liters of water at normal temperature, the mixture being well agitated. After a short time, usually about half an hour, the chlorin is used up and the camphor enters in solution in the benzene. During this reaction the thorough stirring or other agitation of the mixture will insure that the chlorin does not react upon the camphor already formed so long as any isoborneol remains unconverted. By avoiding a surplus of chlorin the camphor will be obtained in a completely pure condition without mixture with any kind of by-product. Upon standing quietly the benzene solution of camphor separates above the stratum of water and can be poured or siphoned off the same. The reaction takes place according to the following equation:

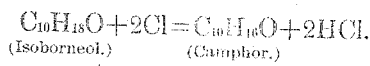
$$C_{10}H_{18}O + 2Cl = C_{10}H_{16}O + 2HCl.$$
(Isoborneol.)     (Camphor.)

The output of camphor is practically quantitative.

Instead of dissolving the isoborneol in any suitable medium—as, for example, the benzene above described—it may be employed in a finely-pulverized condition.

Example II: A mixture of 15.4 kilograms isoborneol, ten kilograms benzene, and seventy kilograms water is well stirred, and thereupon 7.1 kilograms of chlorin passed in in the course of three to four hours. The whole is kept by cooling at a temperature of about 20° centigrade. The camphor which has been formed is contained in the benzene and can be separated in the usual manner.

Example III: 15.4 kilograms of isoborneol are dissolved in forty kilograms of chloroform and into this solution is led 7.1 kilograms of chlorin while stirring the mixture and cooling the same to maintain a temperature of about 15° centigrade. Gaseous hydrochloric acid is evolved. The reaction proceeds according to the equation given in Example I.

When the calculated quantity of chlorin has been introduced, the mixture is washed with water and the chloroform distilled off. The camphor remains behind as a crystalline colorless mass and can readily be obtained pure by redissolving it—as, for example, in petroleum ether.

Having thus fully described my invention, what I claim is—

1. The process of producing camphor, which consists in acting upon isoborneol with chlorin.

2. The process of producing camphor, which consists in dissolving isoborneol, and treating the solution with chlorin.

3. The process of producing camphor, which consists in submitting isoborneol to the action of chlorin in the presence of water.

4. The process of producing camphor, which consists in bringing isoborneol into solution, and adding a solution of chlorin in water.

5. The process of producing camphor, which consists in bringing isoborneol into solution, adding a solution of chlorin in water, stirring the mixture, then allowing it to stand until the solution of camphor obtained by the reaction separates from the water and then removing said solution of camphor.

6. The process of producing camphor, which consists in preparing a solution of isoborneol in benzene, adding to this a solution of chlorin in water, stirring the mixture until the reaction is completed, then allowing the mixture to stand until the benzene and the camphor dissolved in it have separated from the water, and then removing said solution of camphor.

In testimony whereof I hereunto affix my signature in the presence of two witnesses.

LORENZ ACH.

Witnesses:
 HUBERT VIERLING,
 JOS. H. LEUTE.